Aug. 31, 1948.  R. M. BAKER ET AL  2,448,010
TRANSVERSE FLUX INDUCTION
HEATING FURNACE STRUCTURE
Filed June 27, 1944  3 Sheets-Sheet 1

WITNESSES:

INVENTORS
Robert M. Baker, Gordon R. Monroe
and Richard D. Reed
BY
ATTORNEY

Aug. 31, 1948.
R. M. BAKER ET AL
TRANSVERSE FLUX INDUCTION
HEATING FURNACE STRUCTURE
2,448,010
Filed June 27, 1944
3 Sheets-Sheet 2
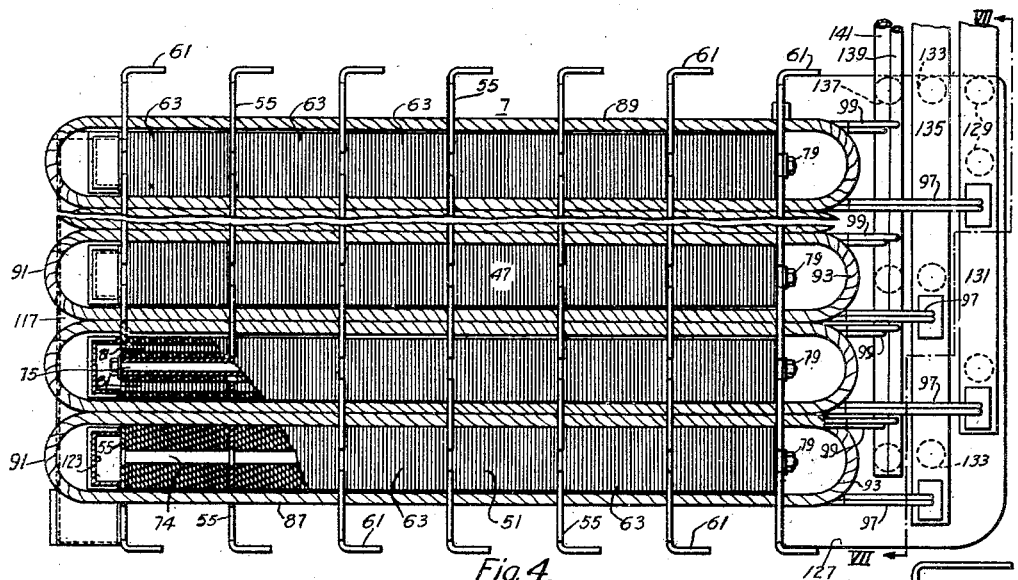
Fig. 4.
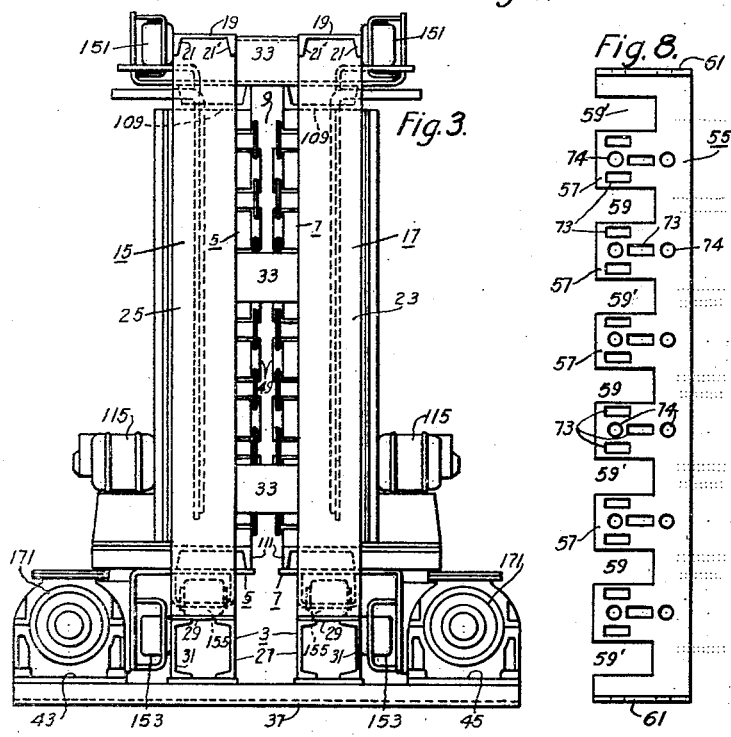
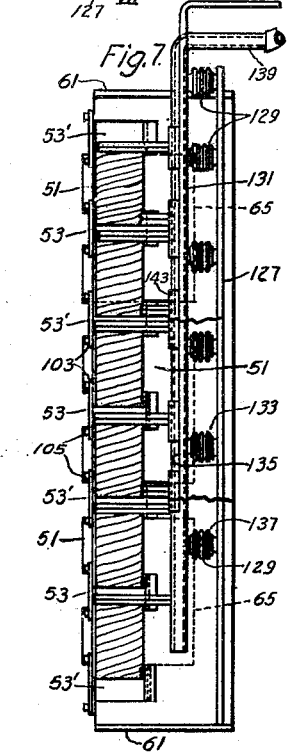
WITNESSES:
INVENTORS
Robert M. Baker, Gordon R. Monroe
and Richard D. Reed
BY
B. L. Zanguill
ATTORNEY Aug. 31, 1948.
R. M. BAKER ET AL
2,448,010
TRANSVERSE FLUX INDUCTION
HEATING FURNACE STRUCTURE
Filed June 27, 1944
3 Sheets-Sheet 3
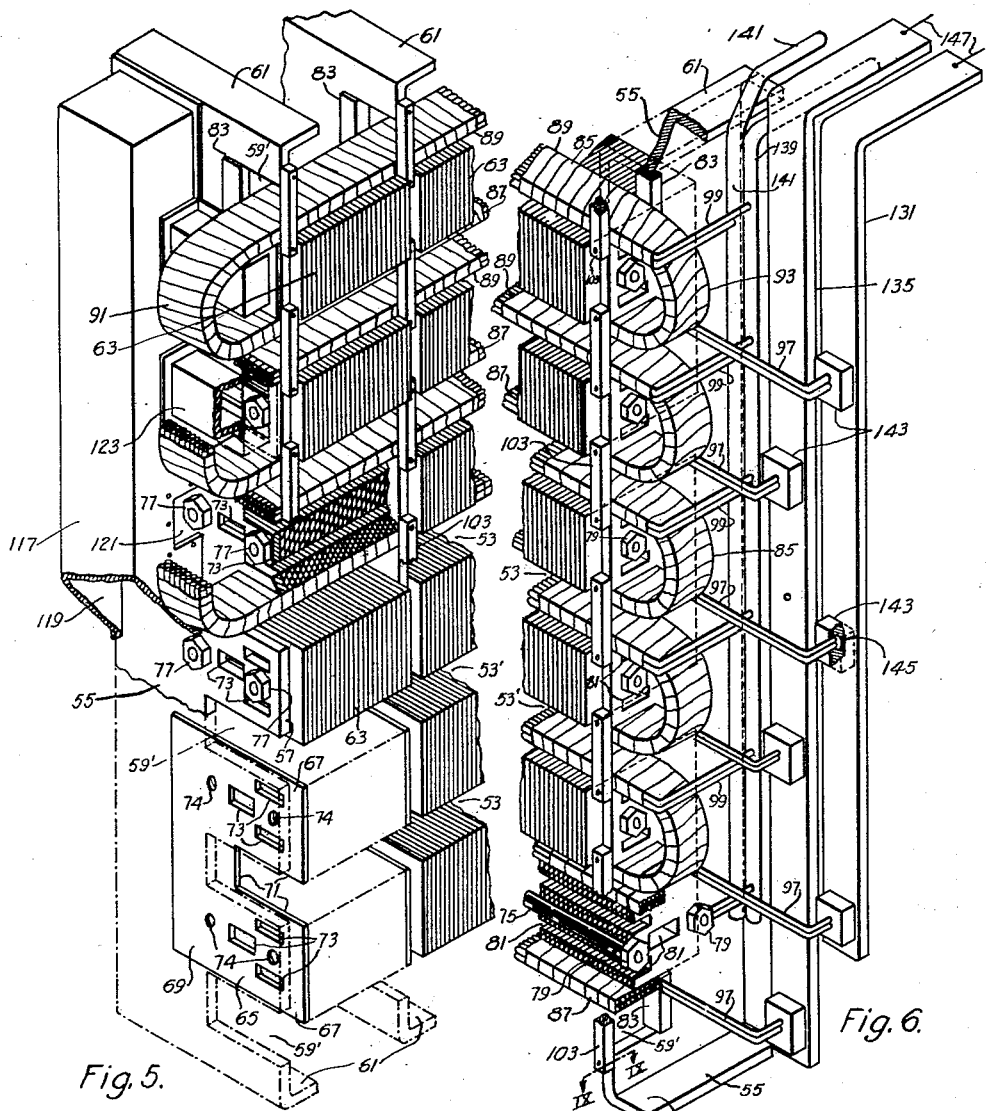
Fig. 5.
Fig. 6.
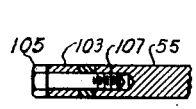
Fig. 9.
WITNESSES:
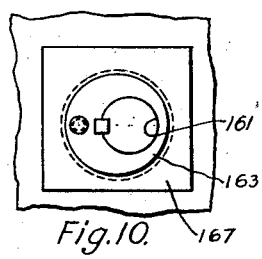
Fig. 10.
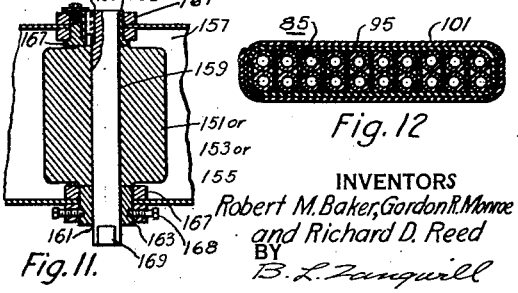
Fig. 11.
Fig. 12.
INVENTORS
Robert M. Baker, Gordon R. Monroe
and Richard D. Reed
BY
ATTORNEY Patented Aug. 31, 1948

2,448,010

UNITED STATES PATENT OFFICE 2,448,010

TRANSVERSE FLUX INDUCTION HEATING FURNACE STRUCTURE

Robert M. Baker, Pittsburgh, Gordon R. Monroe, Sharon, and Richard D. Reed, Clark, Pa., assignors to Westinghouse Electric Corporation, East Pittsburgh, Pa., a corporation of Pennsylvania Application June 27, 1944, Serial No. 542,380

15 Claims. (Cl. 219—13)

Our invention relates to practicable induction heating of elongated material, such as strip, sheet and the like, by means of magnetic flux; and, more particularly, is directed to providing magnetic induction heating means of a type which establishes a magnetic flux across a relatively narrow air-gap which is also a work-passage through which the elongated material is to be passed for inductive heat-treatment.

By subjecting a material to a relatively moving magnetic flux, electric currents are induced therein. If the physical characteristics of the material and the nature of the magnetic field are suitable, practical heating of the material can be obtained for commercial purposes. A heating system of this kind, utilizing transverse magnetic flux, is disclosed and claimed in the patent-application of Robert M. Baker, Serial No. 521,229, filed February 5, 1944. The instant invention is directed to providing an induction heating furnace of improved form, for a heating system such as disclosed in the aforesaid patent-application.

It is an object of our invention to provide an induction heating means or furnace of a type described which has features rendering it easy to build, low in cost, compact, efficient, and easily and simply manipulated.

A further object of our invention is to provide a transverse flux induction heating furnace formed with a pair of magnetic- or field-structures provided with similar pole-faces separated by an air-gap which is relatively shallow but of extended area; the furnace having means for permitting the space between the pole-faces to be easily adjusted for changing the distance between the pole-faces and for setting the pole-faces parallel.

An important object of our invention is to provide a furnace of the type described which is of general application for inductively heating elongated material of different kinds and sizes. To this end, the field-structures, which may weigh several tons apiece, are supported so as to be easily and separately adjusted in any of a plurality of different directions. In the specific embodiment herein disclosed, the field-structures are relatively adjustable in the planes of their pole-faces and in a direction generally normal to such planes. The furnace is provided with means which permits the field-structures to be readily moved in accordance with operating conditions, as more fully described in the aforesaid Baker patent-application, this movement being made without disturbing the distance across the airgap between the field-structures.

Our invention also includes a number of features which enable us to provide a high-capacity induction-heating furnace in a relatively small space, so that the heat can be quickly introduced into the work. These include the novel structure of the apparatus, means for energizing and cooling the magnetizing coils, arrangements of the magnetic parts and supporting means, and other details tending for simplicity and economy.

The foregoing and other objects, features, details, combinations, and innovations of our invention will be discernible from the following description thereof, which is to be taken in conjunction with the accompanying drawings. The drawings show the important parts of a preferred form of our invention, in figures which are on varying scales; and in some of the figures common parts and details have been omitted for clarity of illustration.

Of these figures:

Fig. 3 is an end elevational view of the furnace;

Fig. 4 is a side elevational view of the core and magnetizing means of a field-structure, looking at its pole-face;

Fig. 5 is a perspective view of an end of a field-structure with parts broken away for more clearly showing the assembly;

Fig. 6 is a perspective view, with parts broken away, of the end of the field-structure, which is opposite to the end shown in Fig. 5, but viewed from a different angle;

Fig. 7 is an end elevational view of the structure shown in Fig. 6 substantially on the line VII—VII of Fig. 4;

Fig. 8 is a lengthwise view of a frame-bar used in the field-structure;

Fig. 9 is a section along the line IX—IX of Fig. 6.

Fig. 10 is an elevational view of a support of an eccentrically supported roller-means on which the field-structure rides;

Fig. 11 is a section through the roller-means; and

Fig. 12 is a section through a coil-side of a magnetizing coil for our invention.

Our invention is directed to providing an induction heating furnace for the heating, on a commercial scale, of elongated material, such as strips, sheets, plates, and the like, which is continually or continuously fed through the furnace; the furnace providing magnetomotive forces directed, in general, perpendicular to the face of the elongated material, and of sufficient intensity, even when pulsating at frequencies obtainable from rotating machinery or from standard power lines, for raising the material to the temperature desired.

Figure 1:
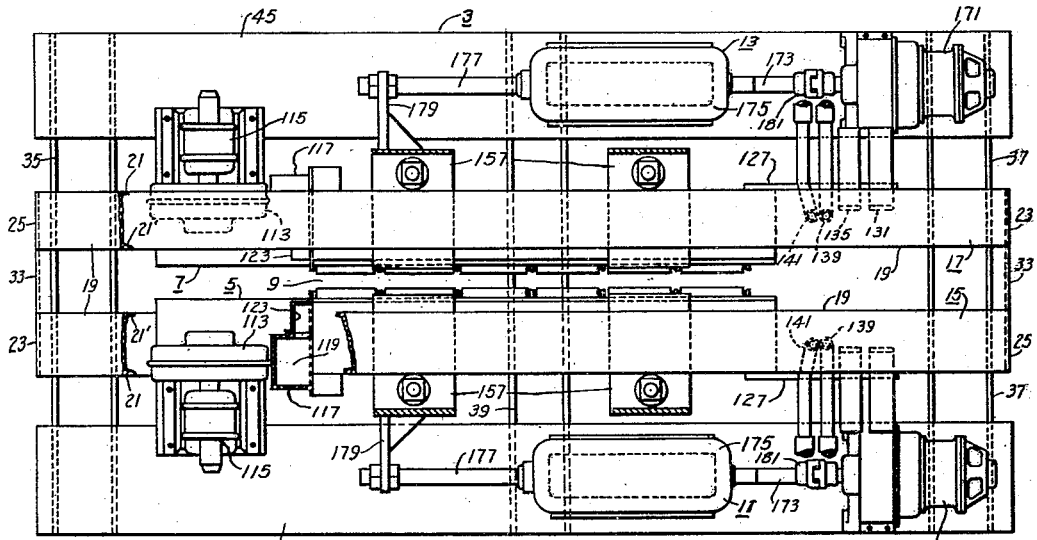
Figure 1 is a plan view, with some parts broken away, of an induction heating furnace, in accordance with our invention, having its air-gap or work-passage centrally thereof.
Figure 2:
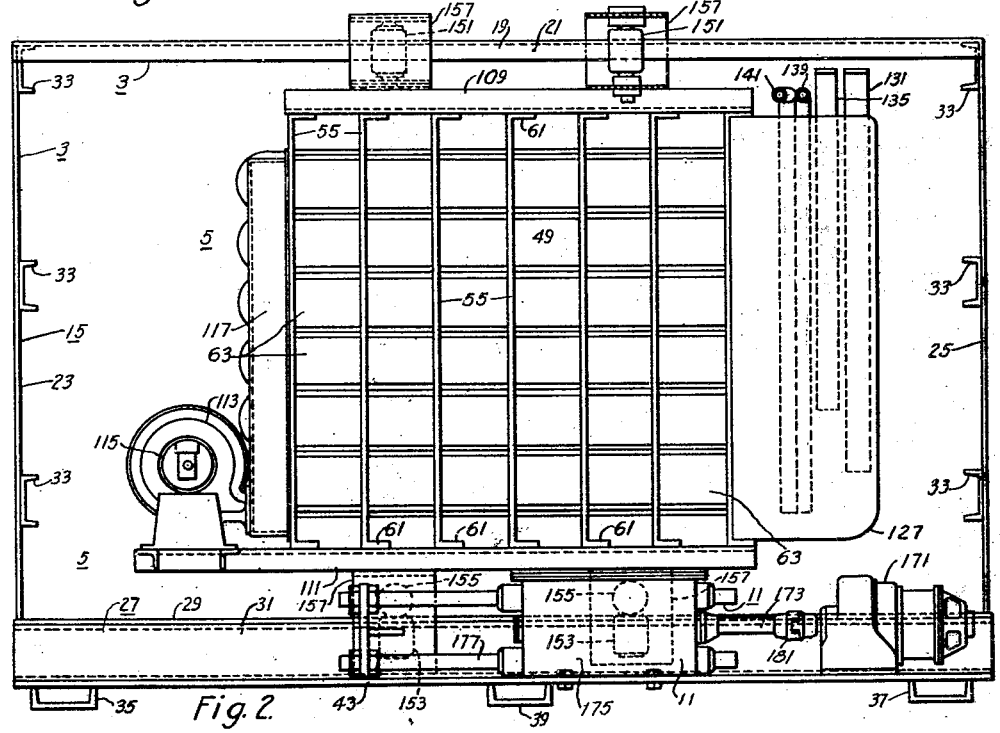
Fig. 2 is an elevational view of the furnace illustrating the back side of the field-structure, which is opposite to its pole-face side.

Referring more particularly to Figures 1 through 3, a form of induction furnace, in accordance with our invention, comprises an open stationary welded unitary frame-work 3; two magnetic- or field-structures 5 and 7 carried by, but movable with respect to, the framework, and spaced to provide work-passage 9 therebetween; and gearing means 11 and 13 supported by the framework and associated respectively with the field-structures 5 and 7 for moving them. Strip and sheet can be inductively heated by passing it downwardly through a magnetic field established in the work-passage 9.

The framework 3 includes, in effect, similar rectangular fixed frames 15 and 17, each of a size for receiving an associated field-structure 5 and 7, respectively, within it. Each frame comprises a horizontal top channel 19, having depending legs 21 and 21' on its outer or back side and on its inner or pole face side, respectively, upright end-bars 23 and 25, and a horizontal bottom bar-member 27 having an upper horizontal support plate 29 and an outer upstanding side bar or channel 31. The frames 15 and 17 are fastened together by a plurality of spaced short cross-pieces 33 at the ends of the framework, between and welded to the end-bars 23 and 25 of the frames, and by transverse end base-channels 35 and 37, respectively, at the bottom left and right ends of the framework, with respect to Figs. 1 and 2, and by a transverse central base-channel 39. The base-channels project outwardly beyond the frames 15 and 17 for receiving supporting plates 43 and 45 which run for the horizontal length of the framework at opposite sides of the bottom thereof, and support gearing 11 and 13, respectively.

The field-structures 5 and 7 are generally similar but arranged and adapted for operation on opposite sides of the work-passage 9 which, in this case, is also the air-gap between the field-structures, so that a description of the details of one field-structure will also apply, for the most part, to the other field-structure. Each field-structure comprises a core having a pole-face 47, defining one side of the work-passage 9, and a back-face 49 on the side of the field-structure opposite to the work-passage. With particular reference to Figs. 4–8, the core comprises a plurality of alternating horizontal pole-teeth 51 and coil-receiving slots 53 and 53', extending the length of the core, between its ends.

Each field-structure is built about a plurality of spaced parallel frame-bars 55, each comprising a plurality of spaced bar-teeth 57 forming alternating slots 59 and 59' therebetween. The ends of the frame-bars 56 are turned at right-angles to provide fastening flanges 61. The spaced frame-bars may be made of magnetic or non-magnetic metal, or even may be made of insulation, such as for example, an asbestos bar. In one embodiment of our invention, all frame-bars are steel.

Stacks 63 of U-shaped laminations 65 are provided between each pair of adjacent frame-bars 55.

As more particularly shown in Fig. 5, each lamination has two teeth 67 extending from a body portion 69 of the lamination and providing therebetween a lamination slot 71. Each tooth of each lamination is provided with a plurality of ventilating holes 73 and bolt-holes 74; and correspondingly arranged ventilating-holes and bolt-holes are provided in the teeth of the frame-bars 55.

The alternating magnetic stacks 63 and frame-bars 55 are bolted together by through-bolts 75, passing through the bolt-holes, which have nuts 77 and 79 on opposite ends for clamping the parts of the assembly tightly together. The frame-bars have continuous portions which project beyond the stacks 63, on the side away from the teeth.

The assembly is such that each horizontal row of lamination-stacks is spaced from the next vertical row of lamination-stacks, a distance which is equal to the width of the lamination slots 71. Accordingly, horizontally aligned frame-bar slots 59' and the elongated spaces between each pair of vertically adjacent rows of lamination-stacks comprise the coil-receiving slots 53'. A coil-receiving slot 53 is provided in each row of horizontally aligned lamination-stacks 63 by the horizontal alignment of the associated lamination slots 71 and frame-bar slots 59. Accordingly, the slots 53 are defined by the shape of the laminations in a horizontal row; and the slots 53' by the spacings between the different horizontal rows of laminations. A pole-tooth 51 is formed by each row of the horizontally aligned teeth of the lamination-stacks 63 and frame-bars 55. Accordingly, each horizontal row of stacked laminations provides two pole-teeth.

The aligned ventilating holes 73 in the laminations and in the frame-bars 55 provide a plurality of through ventilating passages 81 for each pole-tooth 51, the passages terminating at the extreme ends of the associated pole-tooth.

In the assembled core-structure the slots 59' in the frame-bars 55 are deeper than the slots 71 of the laminations, and in order to have the bottom of the slots 59 in the same plane as the bottom of the slots 71, channels 83 are provided for the former, as best shown at the top of Fig. 5. This makes all the coil-receiving slots 53 and 53' of the same depth for receiving magnetizing coils 85.

Each coil 85 comprises a double-strand plural-turn helical winding, oblong in shape, providing a lower coil-side 87 and an upper coil-side 89, a left end-turn 91 and a right end-turn 93. The two strands of each coil are of hollow copper tubing and are in conductive relation across their widths throughout the winding. Each coil has its conductor turns insulated by a compressible insulating material 95, such as asbestos tape; and the whole coil is wrapped in outer insulating tape 101. Each coil has a lower end conductor-portion 97 and an upper end conductor-portion 99 coming out at the same end of the coil, as shown more particularly in Figs. 4 and 6. All coils are wound in the same direction and have their several end conductor-portions at one end of the field-structure.

Each coil has a coil-side in a slot 53 and its other coil-side in a slot 53'. In width, the coil-sides do not extend to the pole-face 47 of the pole structure. For securing the coils in place, clamping-bars 103 are provided, each of a length just sufficient to span a coil-receiving slot 59 or 59' in the frame-base 55. The clamping-bars 103 are provided with holes at their ends for receiving screw-bolts 105 which are secured into threaded holes 107, of suitable length, at each edge of a tooth 57 in the frame-bars 55. The clamping-bars 103 are below the pole-tips of the pole-teeth 51, the pole-tips being the surfaces of the poles, which form the pole-face 47. Tightening the screw-bolts 105 compresses the coil-sides into the core-slots therefor, and clamps them in place at a plurality of points, depending on the number of frame-bars 55 across a pole-structure, seven such bars being shown in the equipment herein described. The magnetizing coils 85 are longer than the pole-teeth, so as to provide clearance between the end-turns 91 and 93 of the coils and the outermost frame-bars 55, this clearance being used for a ventilating system.

As best shown in Figs. 1, 2 and 5, the upper flanges 61 of the frame-bars 55 are secured to a horizontal channel 109 which spans the core, and the lower flanges 61 are secured to a lower channel 111 of somewhat greater length than the channel 109, to provide a protruding portion for receiving a blower 113, driven by a motor 115, at an end of the core opposite to that at which the coil end conductor-portions 97 and 99 are located. The blower motor preferably is supported on a plate secured to the channel 111, the plate extending backwardly away from the work-passage.

The ventilating system comprises a distributing manifold or header 117 that is gas-tightly secured to the outermost frame-bar 55 at the end side of the core-structure, for providing an air-duct 119. The header 117 is connected to the exhaust of the blower 113 and extends for the full length of the core-structure. The header 117 has openings 121 directed toward the spaces inside of the end-turns 91. Small branch conduits 123 are disposed inside these end turns, each of which is gas-tightly secured about an opening 121 and about the ventilating openings 73 in the associated tooth of the end frame-bar 55. Ventilating air from the blower 113 goes through the header 117, passes into the conduits 123 and flows through the ventilating passages 81 in the various pole-teeth 51, from whence the air discharges into the atmosphere at the spaces inside the end-turns 93.

The energizing and liquid-cooling means for the coils are on the other end of the core, which is opposite to the end at which the ventilating blower means are provided. At this other end, a flat mounting-plate 127 is secured to and extends outwardly or away from the associated outermost or end frame-bar 55. With more particular reference to Figs. 4 and 7, a plurality of spaced insulators 129 are secured to the mounting-plate 127, in vertical alignment near its edge, for receiving an outer bus-bar 131, secured to their insulated ends. A second series of spaced insulators 133 are secured to the mounting-plate 127 for supporting a second bus-bar 135. Still another set of spaced insulators 137 are secured to the mounting-plate 127, between the bus-bar 135 and the right end-turns 93 of the coils 85, for supporting a water inlet-pipe 139 and a water outlet-pipe 141. The pipes 139 and 141 are of metal, being closed at their bottom ends and receiving loose flexible pipe connections at their upper ends, which permit movement of the field-structure in the range desired. The two water-pipes are joined together so as to be at the same electrical potential, and so as to act as a common bus-bar.

One strand of the upper end conductor-portions 99 of each coil is connected to one of the water-pipes, and the other strand to the other water-pipe, so that water may flow into one strand and out of the other; the strand on the outside of the coil going to the inlet-pipe and the inner strand going to the outlet-pipe in the embodiment described.

As shown in Figs. 4 and 6, the lower end conductor-portions 97 of the coils are alternately connected to the bus-bars 131 and 135, with that of the upper coil associated with the upper pole-tooth of any particular stack 63 going to the bus-bar 131, and that of the lower coil which is associated at the same stack, going to the bus-bar 135. Each lower end conductor-portion is conductively connected to its associated bus-bar by means of a metal block 143, the bottom of which is welded or otherwise secured to the bus-bar, and the opposite side of which is provided with a hole 145 which fittingly receives the hollow extremities of both strands of an end conductor-portion. This hole 145 is deeper than the part of the lower end conductor-portion which extends therein. This conductor-portion is water-tightly secured to the block 143, so that water discharging from one strand of a lower end conductor-portion will flow into the hole 145 and back into the other strand of the same end conductor-portion.

When a source of electrical potential is connected across the bus-bars 133 and 135, through flexible connections 147 which permit movement of the field-structure, the flow of current at any instant may be traced from one bus-bar, say the bus-bar 131, to a block 143, to the end conductor-portion 97 connected thereto, through the upper coil 85 associated with a stack of laminations, to the upper end conductor-portion 99 of this coil, to the water-pipes 139 and 141 acting as a bus-bar, along these water-pipes to the upper end conductor-portion 99 of the lower coil 85 which is immediately below the upper coil on the same stack of laminations, through this lower coil, to the lower conductor end-portion 97 of this lower coil, to the block 143 to which this end conductor-portion is connected, and finally to the bus-bar 135. Accordingly, the two coils associated with each stack of laminations are energized in series by the current flowing in opposite directions in each, so that one pole-tooth is of north polarity at the same time that the next adjacent pole is of south polarity.

The electrical connections for the other field-structure is generally the same, except that the end conductor-portions of the coils are connected reversely to the bus-bars, so that a north pole of one field-structure will be opposite a south pole of the other field-structure, with the work-passage therebetween, in accordance with the aforesaid R. M. Baker patent-application. However, other forms of energization are obviously possible which would give a different relationship between the polarities of the poles of a single field-structure, or between the opposite poles on the different field-structures, or both.

For water-cooling, water is admitted through the inlet-pipe 139, passing through one strand of a single coil to a block 143 where the water reverses and passes into the other strand of the same coil. The water then circulates through this other strand, the other end of which is connected to the outlet-pipe 141. Accordingly, while the electrical energy passes in series through two coils, the water circulation is in parallel in the respective coils, but in series through the two strands of each coil. By insulating the bus-bars and the set of water-pipes any one of them may be grounded, depending on the manner in which the electrical power supply is grounded, if at all. If the center or midpoint of the power voltage supply can be grounded, then all voltage is removed from the water supply by grounding the water inlet- and outlet-pipes.

As shown in Figs. 2, 3, 10 and 11, each field-structure is upstandingly movably supported in the framework 3 by anti-friction means located at the back side of the field-structure. The anti-friction means comprises a pair of upper rollers 151, rotatable about a vertical axis, a pair of lower rollers 153, rotatable about a vertical axis, and a pair of weight-carrying rollers 155, rotatable about a horizontal axis, all of which are rotatably attached to the field-structure through housings 157. The rollers 151 ride on the back surface of the leg 21 of the top channel 19, the lower rollers 153 ride on the back surface of the side-bar 31, and the horizontal rollers 155 ride on the plate 29. By locating the vertical rollers 151 and 153 at the back side of the center of gravity of a field structure, and having them bear on the back side of the leg 21 and sidebar 31, the field-structure is prevented from toppling because of its own weight; and the attractive forces of the field-structures, when energized so as to cause the magnetic flux to be directly across the work-passage, is resisted. For further security, and to resist backwardly directed forces which might arise in other embodiments or with other forms of magnetization, rollers may be provided on each field-structure which ride on the inner legs 21' of the channels 19.

In order to adjust the field-structures, each roller has a stationary shaft 159 (Figs. 10 and 11), about which it rotates, fastened in holes 161 eccentrically placed in opposite circular discs 163, the shaft being keyed to one of the discs by means of a key 165. The discs, in turn, are rotatably supported for adjustment in bearings 167, secured to the housing 157. By loosening set screws 168 and applying a wrench to the squared end 169 of a shaft 159, the associated discs 163 may be rotated in the bearings 167, displacing the eccentric holes 161, and thereby changing the distance of the axis of the shaft 159 from the surface which the associated roller engages.

By adjusting the vertical rollers 151 and 153, the disposition of the pole-faces of the respective field-structure can be varied with respect to each other, and set in parallel or other relation. Parallel pole-faces are at present preferred for heating sheet of substantially uniform width. Adjusting the horizontal rollers 155 permits vertical adjustment of the field-structure within a limited range.

For moving each of the field-structures laterally between the end-bars 23 and 25 of the associated frame, the gearings 11 and 13 are utilized. Each gearing comprises a reversible motor 171 driving a worm shaft 173 inside a gear box 175. In this gear box, the worm shaft is meshed with a movable worm nut fixed to slide shafts 177, in turn fixed to a plate 179 that is attached to a housing 157 of the field-structure. Rotation of a motor 171 in either direction causes the nut inside the gear box 175 to move on the worm shaft 173 in accordance with the direction of rotation of the motor. Movement of the nut causes sliding of the shafts 177 to which the nut is fixed. The field-structure follows this movement.

It is desirable to secure the motor 171 and the gear box 175 adjustably to the supporting-plate 43, so that they can be moved thereon in accordance with the adjustments of the pole-structures through the rollers. Vertical adjustments of the field-structures can be followed by shimming of the motor and gear box. However, if desired, universal joints such as the joints 181 can be provided to permit adjustments of the field-structures without disturbing the mounting of the motor and gear box.

As an indication of the size of the novel equipment herein disclosed, an actual embodiment of our invention comprised a pair of field-structures each weighing 2½ tons, with each of the six poles laterally across a field structure being about 4½ feet long and 6 inches wide. The windings were made of strands of ⅜ inch O. D. copper tubing, each strand having 10 turns.

While we have described our invention in a preferred form, it is obvious that many modifications and equivalents can be applied thereto; and further elements can be connected therewith, as more particularly shown in the copending application of R. M. Baker, Serial No. 553,381, filed September 9, 1944.

We claim as our invention:

1. Induction heating means comprising, in combination, a plurality of magnetic structures having generally matching spaced pole-faces on opposite sides of a work-passage through which elongated material is adapted to be passed for inductive heat-treatment, stationary means for supporting said magnetic structures, said stationary supporting means having material-passage openings aligned with said work-passage, adjustable means, associated with said stationary supporting means and said magnetic structures, for preadjusting the spacing between the pole-faces of said magnetic structures, and a power driving means for changing the relative positions of said magnetic structures, while maintaining the spacing in which said pole-faces have been placed by said adjustable means.

2. Induction heating means comprising, in combination, a pair of magnetic structures, each having an upstanding pole-face and magnetizing coil-means; a frame-work having two spaced frames, each for supporting one of said magnetic structures so that said pole-faces are in spaced relation for providing a relatively extended but narrow work-passage for receiving elongated material to be inductively heated, said frame-work comprising means for maintaining said frames in relatively fixed position on opposite sides of said work-passage, and comprising a plurality of spaced fixed rail-members associated with each frame; each of said magnetic structures having anti-friction means bearing against said rail-members of the framework, said anti-friction means cooperating with said rail-members and having adjusting means for permitting said magnetic structures to be adjusted relatively with respect to each other, said anti-friction means and said rail-members being constructed and arranged for resisting magnetic and gravitational forces tending to displace said magnetic structures, during operation of the induction heating means.

3. Induction heating means comprising, in combination, a pair of magnetic structures; each having an upstanding pole-face and magnetizing coil-means therefor, a framework for supporting said magnetic structures so that said pole-faces are in spaced relation for providing a relatively extended but narrow work-passage for receiving elongated material to be inductively heated, said framework having a pair of spaced work-receiving openings at opposite ends and in-line with said work-passage, said framework comprising means for maintaining said magnetic structures in a predetermined preadjusted position, and comprising a plurality of spaced fixed bar-members; adjusting means cooperating with said bar-members of said framework for the preadjustment of the position of said magnetic structures selectively in a direction toward or from each other, and means for moving one of said magnetic structures relatively to the other in a direction along a side of said work-passage.

4. Apparatus for an induction furnace of a class described, comprising, in combination, a frame, a magnetic structure upstandingly carried by said frame, said magnetic structure comprising a plurality of poles providing an upstanding pole-face, and magnetizing coil-means, and means for movably positioning said magnetic structure by moving it on said frame, the last-said means comprising a motor and mechanical gearing interconnecting said frame and said magnetic structure, and anti-toppling means associated with said frame and said magnetic structure for preventing said magnetic structure from toppling from its upstanding operable position.

5. Apparatus for an induction furnace of a class described, comprising, in combination, a frame comprising an upper and a lower frame-member, a magnetic structure upstandingly carried by said frame, said magnetic structure comprising a plurality of poles providing an upstanding pole-face, and magnetizing coil-means, said poles having a plurality of ventilating passages, said magnetic structure comprising a blower and a conduit means for directing air from said blower to said ventilating passages, said blower and conduit means being fixed to said magnetic structure backwardly of said pole-face, and means for movably positioning said magnetic structure by moving it on said frame, the last-said means comprising a motor fixed to one of said frame-members, mechanical gearing connecting said motor and said magnetic structure, and anti-toppling means on the side of said magnetic structure which is opposite to said pole-face, for maintaining said magnetic structure in upstanding operable position, said anti-toppling means comprising a member frictionally bearing on the other of said frame-members.

6. In an induction furnace means, the combination of a stationary frame comprising a plurality of frame-members having rail-surfaces at an angle to each other, a magnetic structure having a plurality of anti-friction devices engaging said rail-surfaces for floatingly carrying said magnetic structure, said magnetic structure comprising a core, and means for altering the relative position of said core and either of said rail surfaces.

7. A magnetic structure for an induction furnace comprising a core formed with a plurality of alternating elongated poles and slots, means for magnetizing said poles comprising a plurality of coils, each coil having end-turns spaced from opposite ends of said core, and end-conductors at a first of said core-ends, each of said poles having a ventilating passage starting at a second core-end and terminating at said first core-end, and conduit means comprising a plurality of branches at said second core-end inside the end-turns thereat, said branches being in communication with said ventilating passages for directing ventilating medium thereto.

8. The structure of claim 7, characterized by said conduit means including a distributing header to which said branches are connected, said header being at the back side of said end-turns, opposite the pole-face.

9. A magnetic structure for an induction furnace, comprising a plurality of spaced elongated frame-bars, stacks of aligned U-shaped laminations between said frame-bars, means for securing said stacks and frame bars together for providing a plurality of alternating poles and coil-slots transverse to said frame-bars, magnetizing coils in said coil-slots, and a number of said frame-bars being non-magnetic.

10. A magnetic structure for an induction furnace, comprising a frame having a plurality of spaced substantially parallel frame-bars, a plurality of stacks of laminations between said frame-bars, a plurality of said stacks being arranged in different rows, said laminations being U-shaped to provide a first coil-slot, the rows of stacks being spaced to provide another coil-slot between adjacent stacks, means for securing said stacks between said frame-bars, and magnetizing coil-means having coil-sides in said coil-slots, said frame comprising frame-members securing said frame-bars together, and anti-friction means secured to said frame-members for movably mounting said magnetic structure.

11. A magnetic structure for an induction furnace, comprising a frame having a plurality of spaced substantially parallel frame-bars, stacks of aligned laminations between said frame-bars providing a plurality of alternating poles and coil-slots, bolt means clamping said stacks between said frame-bars in a manner to provide a substantially flat pole-face, coils having coil-sides in said coil-slots, an outermost one of said frame-bars having a mounting-plate secured thereto which extends laterally therefrom, a plurality of insulated bus-bars supported on said mounting-plate, fluid pipes supported on said mounting-plate, said coils comprising hollow conductors in communication with said fluid pipes, whereby cooling fluid may be passed through said coils, said coils having end conductor-portions electrically connected to said bus-bars.

12. A magnetic structure for an induction furnace, comprising a frame, a plurality of rows of U-shaped laminations, the laminations of each row being aligned to provide a coil-slot, means for supporting said rows of laminations spaced on said frame to provide another coil-slot between adjacent rows, magnetizing coil-means having coil-sides in said coil-slots, said laminations being supported in said frame with the tips of their legs substantially in a plane for providing a planar pole-face.

13. An induction heating furnace of a class described comprising, in combination, a frame, an upstanding magnetic structure having an upstanding pole-face, said magnetic structure comprising a plurality of poles and magnetizing coil-means, said frame having a supporting means floatingly carrying said magnetic structure, comprising a horizontally extending bar fixed to the frame, said magnetic structure comprising a bar-engaging means attached thereto on a side of said magnetic structure which is opposite to said pole-face, said bar-engaging means and said bar being constructed and arranged for frictionally cooperating to permit said magnetic structure to be moved while preventing said magnetic structure from toppling during heating operations of said furnace.

14. An invention including that of claim 13, but further characterized by said cooperating bar and bar-engaging means having a means associated therewith for adjusting the position of said magnetic member with respect to said frame.

15. An invention including that of claim 13, but further characterized by said magnetic structure being movably carried in said frame, and means interconnecting said frame and magnetic structure for moving said magnetic structure with respect to the frame, the last said means comprising a motor and mechanical gearing interconnecting the frame and the magnetic structure.

ROBERT M. BAKER.
GORDON R. MONROE.
RICHARD D. REED.

REFERENCES CITED

The following references are of record in the file of this patent:

UNITED STATES PATENTS

| Number | Name | Date |
| --- | --- | --- |
| 1,808,261 | Sessions | June 2, 1931 |
| 1,838,280 | Norris | Dec. 29, 1931 |
| 1,932,423 | Sessions | Oct. 31, 1933 |
| 1,938,607 | Noyes | Dec. 12, 1933 |
| 2,181,652 | Caputo | Nov. 28, 1939 |
| 2,209,637 | Sessions | July 30, 1940 |
| 2,265,627 | Caputo | Dec. 9, 1941 |
| 2,365,021 | Strickland | Dec. 12, 1944 |

OTHER REFERENCES

Dawes, "Electrical Engineering," vol. 1, 1st edition, pages 252–253, published 1920 by McGraw-Hill Book Co., Inc.

Lawrence, "Principles of A. C. Machinery," 2nd edition, page 5, published 1921 by McGraw-Hill Book Co., Inc.